United States Patent
Artman et al.

(10) Patent No.: US 9,329,586 B2
(45) Date of Patent: May 3, 2016

(54) INFORMATION HANDLING SYSTEM DYNAMIC FAN POWER MANAGEMENT

(71) Applicant: Dell Products L.P., Round Rock, TX (US)

(72) Inventors: Paul T. Artman, Austin, TX (US); Shawn J. Dube, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 423 days.

(21) Appl. No.: 13/840,722

(22) Filed: Mar. 15, 2013

(65) Prior Publication Data

US 2014/0277750 A1    Sep. 18, 2014

(51) Int. Cl.
  G05B 13/00    (2006.01)
  G05B 15/02    (2006.01)
  G06F 1/20     (2006.01)

(52) U.S. Cl.
  CPC ........ *G05B 15/02* (2013.01); *G06F 1/20* (2013.01); *G06F 1/206* (2013.01)

(58) Field of Classification Search
  USPC .............. 700/275; 713/300; 361/679.48, 688, 361/695
  See application file for complete search history.

(56) References Cited

U.S. PATENT DOCUMENTS

| | | | |
|---|---|---|---|
| 6,442,700 B1 | 8/2002 | Cooper | |
| 7,451,332 B2 * | 11/2008 | Culbert et al. | 713/320 |
| 8,191,793 B2 | 6/2012 | Byquist et al. | |
| 8,212,501 B2 | 7/2012 | Artman et al. | |
| 8,237,386 B2 | 8/2012 | Culbert et al. | |
| 2005/0128700 A1 | 6/2005 | Alperin et al. | |
| 2006/0168975 A1 | 8/2006 | Malone et al. | |
| 2006/0253633 A1 | 11/2006 | Brundridge et al. | |
| 2007/0268462 A1 | 11/2007 | Shih et al. | |
| 2008/0278905 A1 | 11/2008 | Artman et al. | |
| 2010/0094582 A1 | 4/2010 | Cox et al. | |
| 2010/0321881 A1 | 12/2010 | Ziarnik et al. | |
| 2011/0090087 A1 | 4/2011 | Berke et al. | |
| 2011/0176275 A1 | 7/2011 | Sato | |
| 2012/0140402 A1 | 6/2012 | Mizumura et al. | |
| 2012/0224322 A1 | 9/2012 | Artman et al. | |
| 2012/0275610 A1 | 11/2012 | Lambert et al. | |
| 2013/0060510 A1 | 3/2013 | Cox et al. | |
| 2013/0098599 A1 | 4/2013 | Busch et al. | |
| 2013/0168058 A1 | 7/2013 | Chamseddine et al. | |
| 2013/0254563 A1 | 9/2013 | Culbert et al. | |
| 2013/0344794 A1 | 12/2013 | Shaw et al. | |
| 2014/0073234 A1 | 3/2014 | Elison et al. | |
| 2014/0277821 A1 | 9/2014 | Rubenstein | |

* cited by examiner

*Primary Examiner* — Mohammad Ali
*Assistant Examiner* — Sheela S Rao
(74) *Attorney, Agent, or Firm* — Terrile, Cannatti, Chambers & Holland, LLP; Robert W. Holland

(57) ABSTRACT

Power resource allocation at a chassis that supports plural server information handling systems is enhanced with modifications to power consumption by plural cooling fans based upon available power resources. As available power decreases, at least some of the cooling fans operate at reduced speeds for a given thermal condition to consume less power. In one embodiment, a maximum allowed cooling fan speed is set with a delta value over the fan speed of one or more other cooling fans, such as a delta over the lowest commanded cooling fan speed of the chassis.

20 Claims, 2 Drawing Sheets

INFORMATION HANDLING SYSTEM DYNAMIC FAN POWER MANAGEMENT

BACKGROUND OF THE INVENTION

1. Field of the Invention

The present invention relates in general to the field of information handling system power management, and more particularly to information handling system dynamic fan power management.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems are built from a variety of components that consume electrical power and produce heat as a byproduct of their operations. Generally, information handling systems include some sort of active and/or passive thermal energy management to prevent excessive temperatures that can lead to system failure. Typical active thermal energy management includes attaching heat sinks to components that generate thermal energy and passing a cooling airflow over the heat sinks to remove the thermal energy from the information handling system. Generally, the larger the surface area of the heat sink and the greater the airflow rate used in an active thermal energy management system the greater the amount of thermal energy that is removed from the information handling system.

Although adequate thermal energy management for an information handling system is generally maintained with powerful enough cooling fans, other factors constrain the size of cooling fans available for a particular information handling system. One factor is the size of the housing of the information handling system. Larger housings generally have less impedance to airflow and more size to include larger cooling fans that generate greater cooling airflow. In contrast, smaller housings have greater impedance to airflow so that a given cooling fan tends to have less effectiveness than in a larger housing. In addition, smaller housings have less room for heat sinks so that less heat sink surface area generally leads to less effective thermal transfer for a given cooling airflow. Another constraint on cooling fan size and the number of cooling fans included in a housing is the power consumption by the cooling fans. Typically, an information handling system has a power supply with a maximum power output. In some instances cooling fan power draw varies between 5% and 25% of available power depending upon the thermal conditions within an information handling system housing.

Thermal energy management in multi-node information handling systems can present a complex problem due to the large variation in thermal conditions within an information handling system rack or other type of multi-node chassis. Multi-node server information handling systems often are designed to have a high density to increase the processing capability of systems deployed in valuable data center space. An information handling system rack may include a large number of server information handling systems in a dense arrangement that share power and cooling resources under the control of a chassis management controller (CMC). Thermal conditions within a rack can vary considerably based upon workload at different information handling systems. One difficulty with shared power and cooling resources is that a component or server node cooling request can result in a power draw for a cooling fan that causes a non-linear performance per Watt behavior for a rack. Essentially, a single component or server node can cause a much larger cooling fan speed response than is required by other components or nodes, which results in a relatively large cooling fan power draw that fails to provide a linearly-related decrease in thermal conditions within the rack. Another problem is that a component or server node cooling fan request can draw power that exceeds the power output of a rack power supply, resulting in power supply shutdown or performance impacts on other component or server node operations, such as CPU throttling or other component thermal management actions. In some systems, a fan speed maximum input to a single fan can map to other fans to go full speed resulting in high power consumption with relatively little improvement in thermal transfer from the system.

SUMMARY OF THE INVENTION

Therefore a need has arisen for a system and method which controls cooling fan power consumption while providing effective cooling for thermal management of one or more information handling systems.

In accordance with the present invention, a system and method are provided which substantially reduce the disadvantages and problems associated with previous methods and systems for information handling system power and thermal management. Cooling fan operating parameters adjust based upon power consumption to provide balanced performance for information handling system servers that share power resources of a chassis.

More specifically, a chassis supports plural server information handling system sleds with shared power and cooling resources. A fan controller commands fan speeds for cooling server information handling system sled components based upon sensed thermal conditions and a fan speed configuration. The fan speed configuration is selected based upon power resource availability at the information handling system chassis. If power consumption exceeds a threshold associated with restrictions on processing capabilities, such as throttling of processors, a fan speed configuration applies that conserves power used by cooling fans. A reduced power fan speed configuration caps a maximum fan speed commanded at one or more cooling fans to a fan speed of less than an available maximum fan speed. In one embodiment, the maximum allowed fan speed is determined from a delta over various other commanded fan speeds, such as a delta plus the minimum commanded fan speed, a delta plus a median or mean fan speed, or from other values, such as the relative thermal state of the information handling system chassis considered as whole.

The present invention provides a number of important technical advantages. One example of an important technical advantage is that fan speed behavior is based upon system power consumption to provide improved overall system performance on a per Watt basis. Although reduced fan speed may cause some components to operate in degraded modes, such as with the throttling of CPUs to produce less thermal energy, other components that have not achieved a thermal constraint will have power available for normal operations. Additional constraints on fan speed behavior may be applied to improve performance, such as by relating fan speed settings relative to each other and restricting fan speeds against acoustic constraints. For instance, a maximum fan speed delta between one or more cooling fans prevents a thermal hotspot within a housing from having an undue impact on power consumption. Multi-node systems that share power between cooling fans and processing components achieve a balance in power consumption and thermal management for improved overall processing at a given power consumption.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

An information handling system sharing power and cooling resources manages power consumption by cooling resources to improve system processing performance relative to consumed power. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
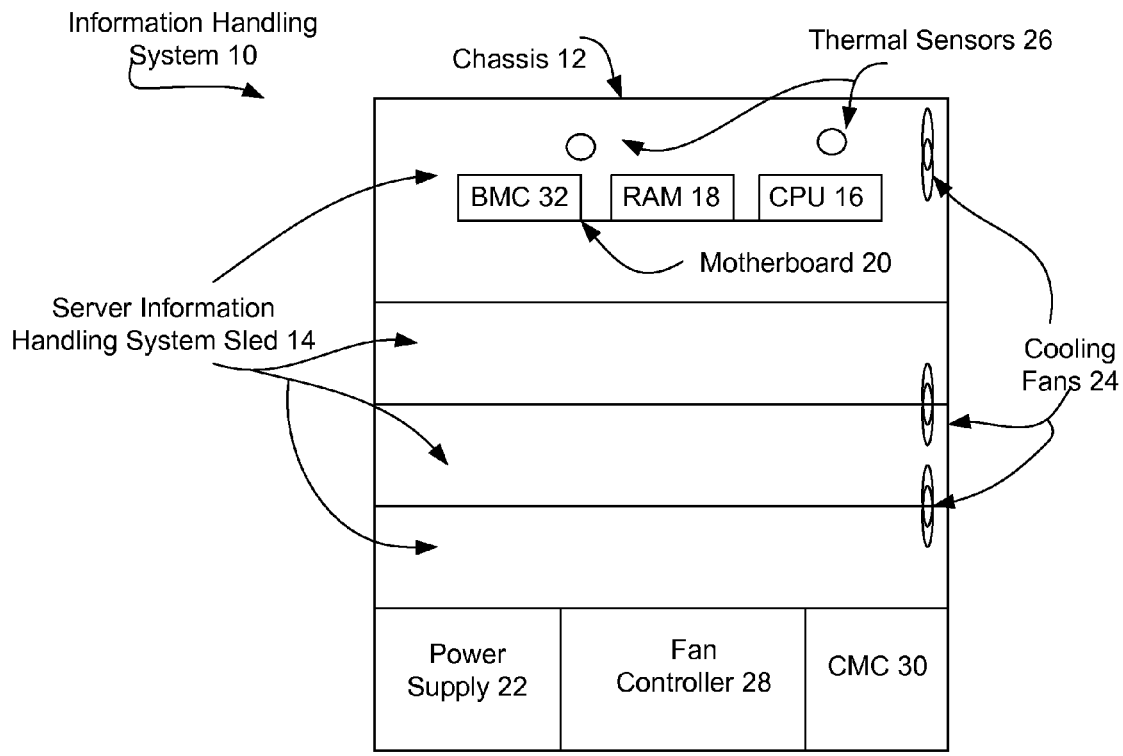
FIG. 1 depicts a side cutaway view of an information handling system having a chassis supporting plural server information handling system sleds with cooling by plural fan speed configurations.

Referring now to FIG. 1, a side cutaway view depicts an information handling system 10 having a chassis 12 supporting plural server information handling system sleds 14 with cooling by plural fan speed configurations. In the example embodiment depicted by FIG. 1, information handling system 10 chassis 12 is a rack that vertically stacks server information handling system sleds 12, each of which includes a CPU 16 and memory 18 disposed on a motherboard 20 for processing information. In alternative embodiments, alternative physical configurations of server information handling system sleds 14 may be used, such as a blade configuration having horizontally stacked blade modules. Server information handling system sleds 14 share power resources, such as one or more power subsystems 22, that provide regulated direct current power used by CPUs 16, memory 18 and other components disposed in chassis 12 and server information handling system sleds 14. For example, power subsystems 22 provide power to plural cooling fans 24 that provide a cooling airflow through chassis 12 to remove excess thermal energy generated by components disposed in chassis 12.

During operation, cooling fans 24 operate at varying speeds to produce varying amounts of cooling airflow in response to thermal conditions within chassis 12. For instance, thermal sensors 26 are distributed throughout chassis 12 to measure temperatures and report the temperatures to a fan controller 28. Fan controller 28 applies the sensed thermal conditions to command fan speeds at each of plural cooling fans 24. Fan controller 28 commands greater fan speeds for cooling fans 24 that are proximate to increased thermal energy and lesser fan speeds for cooling fans 24 that are proximate to reduced thermal energy. As an example, if a server information handling system sled 14 has a relatively high load at a CPU 16, increased processing cycles will increase power consumption from power subsystem 22 and, as a consequence, increase thermal energy output from the CPU 16 as a byproduct of the increased power consumption. The example embodiment depicted by FIG. 1 has fan controller 28 exercising centralized control over fan speeds of plural cooling fans 24, however, in alternative embodiments, fan controller 28 may have logic distributed between various processing and memory resources of chassis 12. For example, a chassis management controller (CMC) 30 may exercise varying degrees of management control over fan speeds in cooperation with baseboard management controllers (BMCs) 32 distributed at the server information handling system sleds 14.

A difficulty that arises with increased fan speeds used to remove increased thermal energy associated with increased processor loads is that available power from power subsystem 22 may reach a limit that reduces power available for performing processing functions. In one example embodiment, power used by cooling fans 24 to remove excess thermal energy can vary from between 5% of the power available from power subsystem 22 to up to 25% of power available. In some instances, power conservation techniques are applied to processing components in order to ensure that adequate power is available for cooling fans 24, resulting in unexpected and nonlinear system performance. To minimize the impact of power consumption by cooling fans 24 on system performance, fan controller 28 implements a variety of power and thermal management constraints that balance system performance against thermal and power limits. Under conditions where power subsystem 22 approaches power supply limits, fan controller 22 analyzes the overall thermal state at chassis 12 to adjust cooling fan 24 speeds so that power is preserved for processing components to operate, even if some of the processing components have to operate under constraints that limit generation of thermal energy.

Fan controller 28 improves overall system efficiency by reducing fan speeds that are associated with less efficient thermal energy transfer. For example, a maximum fan speed in a system having relatively high impedance to cooling airflow does not produce substantial improvements in thermal energy transfer relative to a fan speed of 85% of the maximum fan speed. By setting a maximum fan speed of 85% of an available maximum fan speed, fan controller 28 reduces power consumption of the cooling fan without substantially impacting thermal energy transfer. If a slower fan speed for a cooling fan 24 impacts thermal energy transfer, then components cooled by the restricted cooling fan 24 may have to operate in a reduced power consumption mode to reduce thermal energy created proximate to the restricted cooling fan 24, however, other portions of chassis 12 will have power available that would otherwise have been inefficiently consumed by the restricted cooling fan 24. Fan controller 28 imposes restrictions on cooling fan maximum speeds at a power consumption threshold in a number of possible ways, such as setting fan speed behavior with fan speed configurations based upon power consumption, acoustic limits and performance per Watt requirements, setting a static fan speed limit based on information handling system 10 configuration, fan count, fan location, etc. . . . , and/or setting a maximum fan speed based on difference from other commanded fan speeds.

Figure 2:
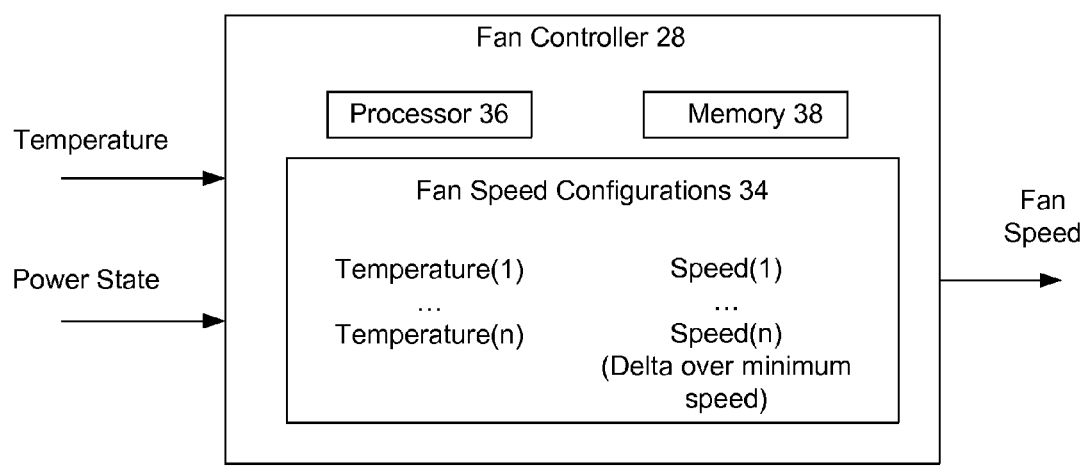
FIG. 2 depicts a block diagram of a fan controller having plural fan speed configurations to determine cooling fan speeds based upon power consumption.

Referring now to FIG. 2, a block diagram depicts a fan controller 28 having plural fan speed configurations 34 to determine cooling fan speeds based upon power consumption. Fan controller 28 has a processor 36 that executes instructions stored in a memory 38 to generate commands for determining cooling fan speeds of plural cooling fans 24 in a chassis 12. In various embodiments, instructions of fan controller 28 may be distributed across plural processors and memory of chassis 12, such as CMC 30, BMCs 32 and cooling fans 24. Fan controller 28 receives thermal sensor measurements from thermal sensors 26 and power consumption information from power supply 22 and applies sensed thermal conditions and available power to a fan speed configuration 34 to determine a fan speed to command for each of the plural cooling fans 24. Essentially, fan controller 28 attempts to set fan speeds in response to the overall chassis thermal state that will efficiently use available power for cooling while preserving at least some power allocated for cooling fan use to instead support processing component operations. To achieve this, fan controller 28 selects one of plural fan speed configurations 34 based upon the amount of available power from power supply 22. For example, as the available power of power supply 22 is consumed, fan speed configurations 34 are used that reduce power consumption by cooling fans 24. A fail safe module 40 overrides restrictions on fan speeds of cooling fans 24 if thermal conditions become excessive to ensure that damage does not occur to components disposed in chassis 12.

In one embodiment, fan controller 28 applies a fan speed configuration 34 at low power utilization rates of power supply 22 that allows commands to cooling fans 24 to run at a maximum allowable speed. Once fan controller 28 detects a power consumption threshold for power consumed from power supply 22, a reduce power consumption fan speed configuration is selected for determining fan speeds at sensed thermal conditions. In one embodiment, a static maximum speed of less than the available maximum speed is applied for one or more of the plural cooling fans 24. A static fan speed cap might also be applied in conditions where a maximum acoustics is desired since the lower maximum fan speed will typically generate less fan noise. In an alternative embodiment, a maximum fan speed is set for one or more cooling fans based upon a delta from one or more other commanded fan speeds. For instance, if a delta is set of 15% for a first cooling fan 24 over a fan speed of a second cooling fan 24 that has a setting of 50%, then the maximum fan speed of the first cooling is 65%. The second cooling fan used for the base onto which the delta is added may be selected with a number of criteria, such as the lowest commanded fan speed of all of cooling fans 24, the median commanded fan speeds of all cooling fans 24, the mean commanded fan speeds of all cooling fans 24, or the commanded fan speed of one or more proximately located cooling fans 24. Restricting fan speeds based upon a delta over other commanded fans speeds effectively takes into account the overall thermal state within chassis 12 so that hot spots within a chassis 12 do not result in inordinate cooling fan power consumption to the detriment of processing operations.

Figure 3:
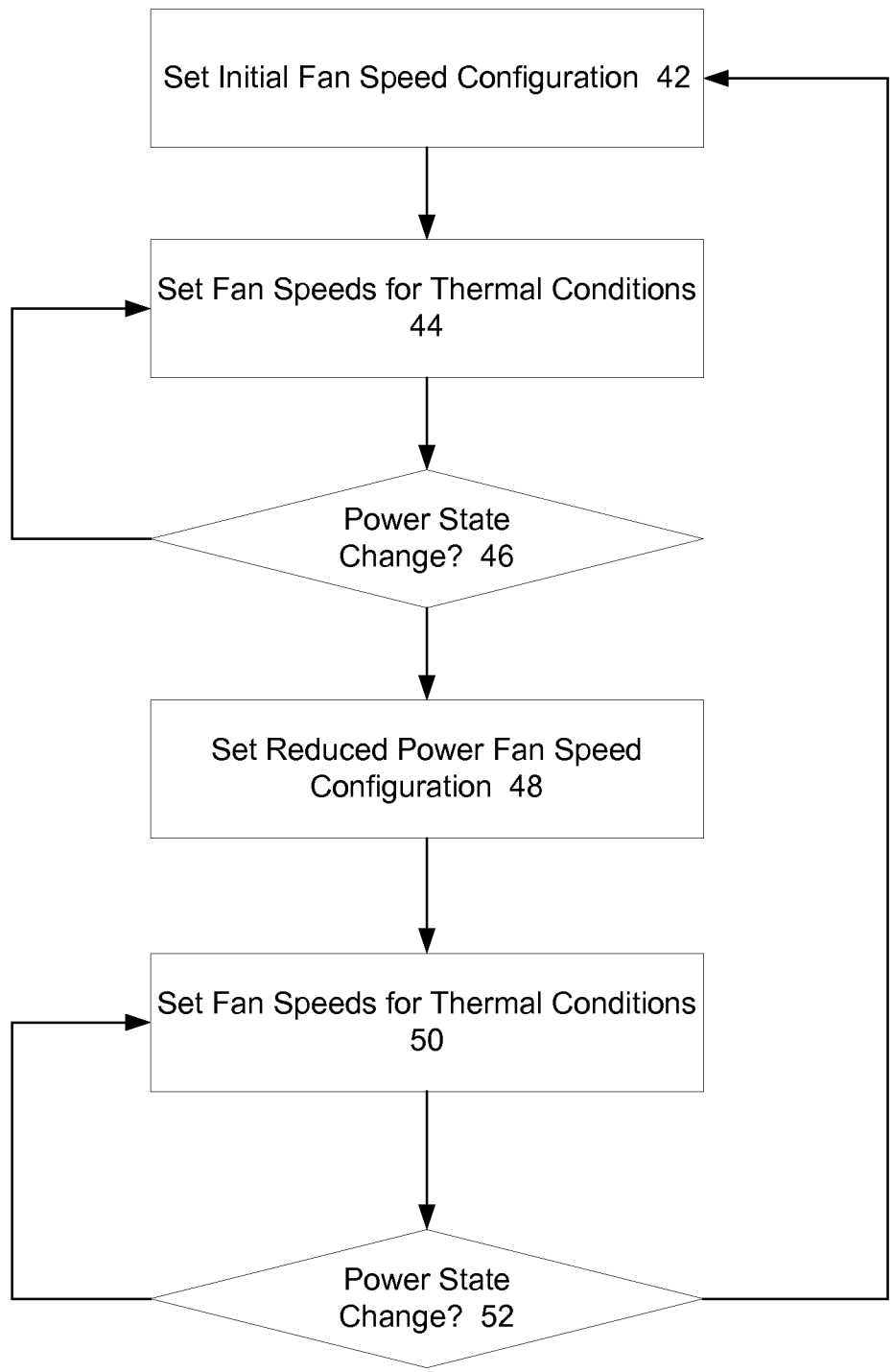
FIG. 3 depicts a flow diagram of a process for setting cooling fan speeds based upon available chassis power resources.

Referring not to FIG. 3, a flow diagram depicts a process for setting cooling fan speeds based upon available chassis power resources. The process starts at step 42 with setting of an initial fan speed configuration that allows commands for fan speeds up to the available fans speeds of all cooling fans. In alternative embodiments, the initial fan speed configuration may include some restrictions on some or all cooling fan speeds below maximum available fan speeds, such as to restrict acoustics. At step 44, fan speeds are set with the fan speed configuration based upon sensed thermal conditions. At step 46, a determination is made of whether power consumed at the information handling system exceeds a threshold. If not, the process returns to step 44 to continue to set cooling fan speeds according to the first fan speed configuration. If the power consumption threshold is met at step 46, the process continues to step 48 to set a second fan speed configuration associated with reduced available power. At step 50 cooling fan speeds are set according to the reduced power state fan speed configuration. For example, a cap is placed on cooling fan speeds to not exceed a delta over the lowest commanded cooling fan speed. At step 52 a determination is made of whether the power consumption threshold remains met. If the power consumption threshold remains, the process returns to step 50 to set cooling fan speeds according to the second fan speed configuration. If the power consumption threshold is no longer met, the process returns to step 42 to set the initial fan speed configuration.

Although the present invention has been described in detail, it should be understood that various changes, substitutions and alterations can be made hereto without departing from the spirit and scope of the invention as defined by the appended claims.

What is claimed is:

1. An information handling system comprising:
a chassis having plural slots, each slot operable to accept a server information handling system sled operable to process information;
plural cooling fans disposed in the chassis and operable to provide cooling airflow to information handling system sleds coupled to the plural slots;
a power subsystem disposed in the chassis and operable to power the plural cooling fans and server information handling system sleds coupled to the plural slots, the power subsystem providing power at plural power levels up to a maximum power level; and
a fan controller interfaced with the plural cooling fans, the fan controller operable to command a fan speed for each of the plural cooling fans based upon one or more thermal measurements associated with each of the plural cooling fans and a fan speed configuration, the fan controller having a first fan speed configuration associated with a first power consumption level and a second fan speed configuration associated with a second power consumption level, the first and second fan speed configurations commanding first and second different fan speeds at common thermal measurement.

2. The information handling system of claim 1 wherein the first fan speed configuration comprises up to a first maximum fan speed and the second fan speed configuration comprises up to a second maximum fan speed.

3. The information handling system of claim 2 wherein the first power consumption level comprises less than a predetermined amount of power and the first maximum fan speed comprises full speed.

4. The information handling system of claim 3 wherein the second power consumption level comprises power consumption of greater than the predetermined amount of power and the second maximum fan speed comprises a maximum fan speed of a predetermined amount less than full speed.

5. The information handling system of claim 1 wherein the first and second fan speed configurations comprise a first and second maximum delta for fan speeds at first and second of the plural cooling fans.

6. The information handling system of claim 1 wherein the first fan speed configuration comprises an independent fan speed for each of the plural cooling fans and the second fan speed configuration comprises a maximum delta between fan speeds of the plural cooling fans.

7. The information handling system of claim 1 wherein the fan controller is further operable to detect a fail-safe thermal parameter and, in response to detecting the fail-safe thermal parameter to apply a fail-safe fan speed configuration allowing a full maximum fan speed at each of the plural cooling fans.

8. The information handling system of claim 1 wherein the second fan speed configuration comprises a maximum delta between a minimum fan speed commanded for at the plural cooling fans and a maximum fan speed commanded for the plural cooling fans.

9. The information handling system of claim 8 wherein the fan controller truncates fan speed commands having a fan speed of greater than the delta over the minimum fan speed to command a fan speed of the minimum fan speed plus the delta.

10. A method for managing operations of server information handling systems that share a chassis power resource, the method comprising:
cooling the server information handling systems with cooling airflow provided by plural cooling fans according to a first fan speed configuration and detected thermal conditions, the first fan speed configuration commanding a first fan speed for a first set of thermal conditions;
detecting a predetermined power resource condition;
in response to detecting, cooling the server information handling systems according to a second fan speed configuration and detected thermal conditions, the second fan speed configuration commanding a second fan speed different than the first fan speed for at least some of the first set of thermal conditions.

11. The method of claim 10 wherein detecting a predetermined power resource condition further comprises:
detecting power drawn from the power resources; and
comparing the power drawn with a maximum power available to draw to determine a power draw threshold.

12. The method of claim 10 wherein the second fan speed configuration comprises maximum fan speed settings for at least some of the plural cooling fans of less than an available maximum fan speed.

13. The method of claim 10 wherein the second fan speed configuration comprises a maximum fan speed of a delta added to a lowest fan speed commanded among the plural cooling fans.

14. The method of claim 10 wherein in response to detecting, cooling the server information handling systems according to a second fan speed configuration and detected thermal conditions further comprises truncating commands for a fan speed of greater than a predetermined amount to the predetermined amount.

15. The method of claim 10 further comprising:
detecting a predetermined thermal condition; and
in response to detecting the predetermined thermal condition, cooling the server information handling systems according to the first fan speed configuration and detected thermal conditions.

16. An information handling system chassis cooling fan controller comprising:
a processor operable to execute instructions to communicate fan speed commands to plural cooling fans; and
memory interfaced with the processor, the memory operable to store instructions for execution by the processor, the instructions configured to:
apply sensed thermal conditions of the information handling system chassis to command a fan speed for each of the plural cooling fans;
determine a predetermined power consumption threshold at the information handling system chassis;
in response to the predetermined power consumption threshold, command a reduction of the fan speed for the sensed thermal conditions for at least some of the plural cooling fans.

17. The information handling system chassis cooling fan controller of claim 16 wherein the reduction of the fan speed comprises preventing a fan speed command of greater than a delta over at least one other fan speed.

18. The information handling system of claim 17 wherein the at least one other fan speed comprises the lowest fan speed commanded for the plural cooling fans.

19. The information handling system of claim 17 wherein the at least one other fan speed comprises a median fan speed commanded at the plural cooling fans.

20. The information handling system chassis cooling fan controller of claim 16 wherein the reduction of the fan speed comprises preventing a fan speed command of greater than a maximum static value at each of the plural cooling fans, the maximum static value.

* * * * *